E. MAREK.
PIPE COUPLING.
APPLICATION FILED JULY 14, 1909.

939,146.

Patented Nov. 2, 1909.

Witnesses:
F. J. Main
W. E. Smith.

Inventor:
Ernest Marek
By Joshua R. H. Potts
his Attorney

UNITED STATES PATENT OFFICE.

ERNEST MAREK, OF CHICAGO, ILLINOIS.

PIPE-COUPLING.

939,146.     Specification of Letters Patent.      Patented Nov. 2, 1909.

Original application filed February 8, 1909, Serial No. 476,668. Divided and this application filed July 14, 1909. Serial No. 507,610.

*To all whom it may concern:*

Be it known that I, ERNEST MAREK, a citizen of the United States, residing at Chicago, county of Cook, and State of Illinois, have invented certain new and useful Improvements in Pipe-Couplings, of which the following is a specification.

My invention relates to improvements in pipe couplings, the object of the invention being to provide a simple and quick acting device of this character which shall be efficient and reliable in use.

The present invention is a modification of that covered by my co-pending application, Ser. No. 476,668, filed February 8th, 1909, the present application being a division of said former one.

A further object of my invention is to provide a novel form of ground-joint connection between the contiguous ends of the coupling.

Other objects will appear hereinafter.

With these objects in view my invention consists in the novel construction and arrangement of parts which will be hereinafter fully described and more particularly pointed out in the appended claims.

Figure 1:
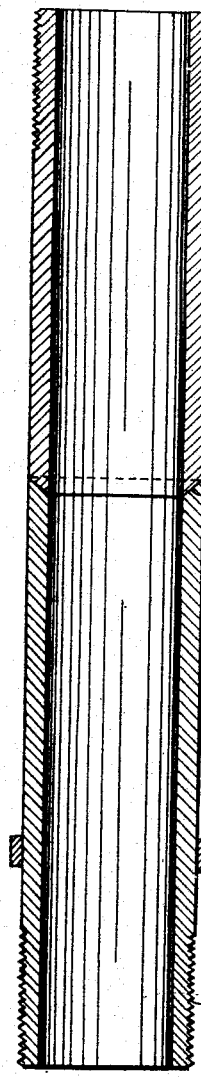
Figure 2:
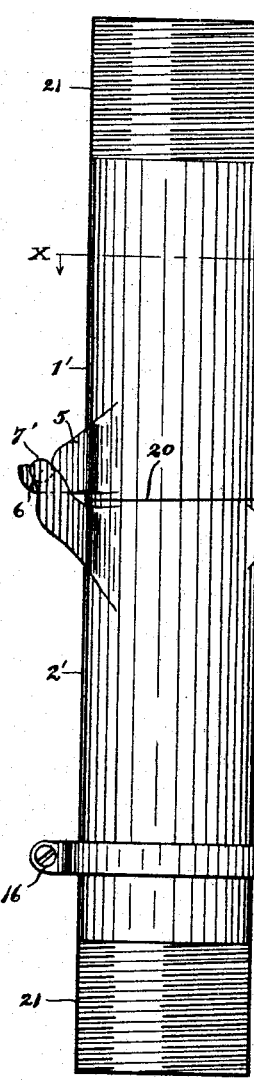
Figure 3:
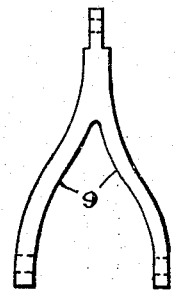
Figure 4:
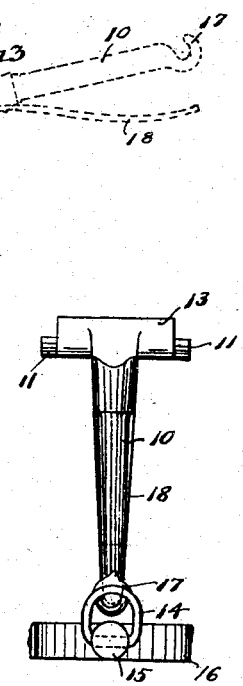
Figure 5:
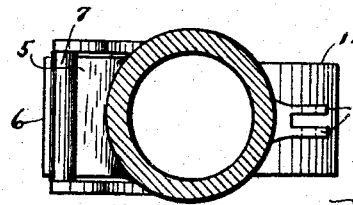

My invention will be more readily understood by reference to the accompanying drawings forming a part of this specification, and in which, Figure 1 is a central longitudinal section of my invention, Fig. 2 is a side elevation thereof, Figs. 3 and 4 are detail views, and Fig. 5 is a transverse section taken on the line *x—x* of Fig. 2.

Referring now to the drawings, 1′ designates one tubular member of the pipe coupling and 2′ the other. Adjacent the end of the member 1′ a lug 5 is provided having a hook 6 adapted to engage the loop 7 extending from and formed integral with the member 2′. This forms a pivot or hinge connecting the members 1′ and 2′.

A conical ground-joint connection is formed between the members 1′ and 2′ and pipe threads 21 are formed on the same, and in order to lock said members securely together a clamping device is provided and arranged diametrically opposite the hook 6 and the loop 7. This device comprises two perforated ears 8 integral with the member 1′ to which is pivoted a fork 9. A substantially T-shaped lever 10 is provided with two ears 11 which are pivoted in the fork 9, which thus serves as a link to attach lever 10 to tube 1. A hook 12 is provided on the member 2′ and with which the portion 13 of the lever 10 is adapted to engage. The fork 9 and lever 10 are so arranged that the portion 13 may engage with the hook 12 when said lever is positioned at 90 degrees with the axis of the members 1′ and 2′, and when said lever is turned into a position parallel with the axis of said members, as indicated by dotted lines in Fig. 2, tight connection is formed. In this action the portion 13 acts as a fulcrum of lever 10, which thus exerts a powerful leverage to draw the tubes 1′ and 2′ together. There is sufficient longitudinal resiliency in the divergent prongs of fork 9 to insure a tight connection between the ground joints.

To lock the lever 10 in the dotted line position, a ring 14 is provided, the same being pivoted in a ball 15 integral with the ring 16 which is clamped to the member 2′. A hook 17 provided at one extremity of the lever 10 is adapted to engage the ring 16 which in conjunction with the curved leaf spring 18 secured to the lever 10 locks the connection.

In order to release the lever 10, the spring 18 is slightly compressed by pressing said lever with the hand, when the ring 16 may be thrown out of engagement with the hook 17.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having described my invention what I claim as new and desire to secure by Letters Patent is:

1. In a pipe coupling, the combination of two tubular members having conical ground connections, a hook and loop connection between said tubular members at one side, a link connection consisting of a fork having divergent elastic prongs, the body of said fork being pivoted to one of said tubular members on the side opposite to said hook and loop connection, a clamping lever pivoted between the prongs of said fork, a hook on the other tubular member adapted to serve as a fulcrum for said clamping lever, a spring carried by said clamping lever, and adapted to throw the same toward unclamping position, a hook on the end of said clamping lever, and a ring secured to the corresponding tubular member and adapted to engage the clamping lever hook, substantially as described.

2. In a pipe coupling, the combination of two tubular members having conical ground connections, a hook and loop connection between said tubular members at one side, a link connection consisting of a fork having divergent curved elastic prongs, said prongs having parallel ends, the body of said fork being pivoted to one of said tubular members on the side opposite to said hook and loop connection, a clamping lever pivoted between the parallel ends of the prongs of said fork, a hook on the other tubular member adapted to serve as a fulcrum for said clamping lever, a spring carried by said clamping lever and adapted to throw the same toward unclamping position, a hook on the end of said clamping lever, and a ring secured to the corresponding tubular member and adapted to engage the clamping lever hook, substantially as described.

In testimony whereof I have signed my name to this specification in the presence of two subscribing witnesses.

ERNEST MAREK.

Witnesses:
HELEN F. LILLIS,
JOSHUA R. H. POTTS.